United States Patent
Bordawekar et al.

(10) Patent No.: US 11,163,761 B2
(45) Date of Patent: Nov. 2, 2021

(54) VECTOR EMBEDDING MODELS FOR RELATIONAL TABLES WITH NULL OR EQUIVALENT VALUES

(71) Applicant: INTERNATIONAL BUSINESS MACHINES CORPORATION, Armonk, NY (US)

(72) Inventors: Rajesh Bordawekar, Millwood, NY (US); Tin Kam Ho, Millburn, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/825,509

(22) Filed: Mar. 20, 2020

(65) Prior Publication Data

US 2021/0294794 A1 Sep. 23, 2021

(51) Int. Cl.

| | | |
|---|---|---|
| *G06F 16/242* | (2019.01) | |
| *G06F 16/22* | (2019.01) | |
| *G06F 9/38* | (2018.01) | |
| *G06N 3/08* | (2006.01) | |
| *G06K 9/62* | (2006.01) | |
| *G06F 40/30* | (2020.01) | |

(52) U.S. Cl.
CPC .......... *G06F 16/243* (2019.01); *G06F 9/3836* (2013.01); *G06F 16/2237* (2019.01); *G06F 40/30* (2020.01); *G06K 9/6256* (2013.01); *G06N 3/08* (2013.01)

(58) Field of Classification Search
CPC .... G06F 16/243; G06F 16/2237; G06F 40/30; G06F 9/3836; G06K 9/6256; G06N 3/08
See application file for complete search history.

(56) References Cited

U.S. PATENT DOCUMENTS

| | | |
|---|---|---|
| 7,099,880 B2 | 8/2006 | Arning et al. |
| 7,565,343 B2 | 7/2009 | Watanabe |
| 8,290,935 B1 | 10/2012 | Lopes |
| 8,443,013 B1 | 5/2013 | Lin et al. |
| 9,349,105 B2 | 5/2016 | Beymer et al. |
| 9,443,194 B2 | 9/2016 | Chu et al. |
| 9,753,962 B2 | 9/2017 | Petschulat et al. |
| 10,019,438 B2 | 7/2018 | Audhkhasi et al. |

(Continued)

FOREIGN PATENT DOCUMENTS

| | | |
|---|---|---|
| CN | 101000612 A | 7/2007 |
| CN | 108710663 A | 10/2018 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Kevin Ky

(74) *Attorney, Agent, or Firm* — Steven M. Bouknight

(57) ABSTRACT

Structured and semi-structured databases and files are processed using natural language processing techniques to impute data for null value tokens in database records from other records that have non-null values for the same attributes. Vector embedding techniques are used, including, in some cases, appropriately tagging null value tokens to reduce or eliminate their undue impact on semantic vectors generating using a neural network.

13 Claims, 13 Drawing Sheets

(56) References Cited

U.S. PATENT DOCUMENTS

| | | | |
|---|---|---|---|
| 10,409,820 B2* | 9/2019 | Dua | G06F 16/93 |
| 2004/0083092 A1* | 4/2004 | Valles | G06F 40/30 |
| | | | 704/9 |
| 2006/0224584 A1* | 10/2006 | Price | G06F 16/313 |
| 2007/0288492 A1 | 12/2007 | Chen | |
| 2014/0188928 A1 | 7/2014 | Singh et al. | |
| 2015/0088907 A1 | 3/2015 | Li et al. | |
| 2017/0126741 A1* | 5/2017 | Lang | G06F 21/604 |
| 2020/0073939 A1* | 3/2020 | Levchenko | G06N 3/126 |
| 2020/0192921 A1* | 6/2020 | Satterfield | G06F 40/169 |
| 2021/0049419 A1* | 2/2021 | Bhaowal | G06N 5/045 |

OTHER PUBLICATIONS

International Search Report and the Written Opinion of the International Searching Authority, or Declaration, Patent Cooperation Treaty, DATE, 9 pages, International Application No. PCT/IB2021/051904.

Zhang, "Research on Null Value of Relational Database," Nanjing University of Aeronautics and Astronautics [thesis], Dec. 2007, 75 pages.

Bordawekar, et al., "Vector Embedding Models for Relational Tables With Null or Equivalent Values," Application and Drawings, Filed on Mar. 8, 2021, 38 Pages, Related PCT Patent Application Serial No. PCT/IB2021/051904.

* cited by examiner

```
2e92d2e-761e-44ab-a3c3-4ef86a04300f,MDMPER,60017,
                                  ,40.754757 -73.601772 ,rubiery,    ,982,CN35U5OUWQ,37123008379651O 75039e65-4c4e-4502-a6a1-0d9257e5455e,MDMPER,60017
             ,40.754757 -73.601772 ,rubiery,    ,982,CN35U5OUWQ,37123008379651O 49a530a9-076c-413e-bb95-28403e31506f,MDMPER,60017,
              ,40.754757 -73.601772 ,, ,982,CN35U5OUWQ,37123008379651O 6c609333-8dec-4c29-9f6a-3ae74506ed11,MDMPER,60017
            41.595236084031704 -73.601772 ,rubiery,    ,982,CN35U5OUWQ,37123008379651O
```

RECORDID_99310 SEX_M FNAME_JOSEPH LNAME_ROBERTS DATE_1992 SSN_054-91-6381 HPHONE_929-914-1128 HSTREET_CHARLES_ST HCITY_PORT_WASHINGTON HSTATE_NY HZIP_11050 DLSTATE_LA

RECORDID_99311 LNAME_ROBERTS DATE_1992 SSN_EMPTY HPHONE_929-914-1128 HSTREET_CHARLES_ST HCITY_PORT_WASHINGTON HSTATE_NY HZIP_11050 DLSTATE_LA

RECORDID_99312 LNAME_ROBERTS DATE_1992 SSN_054-91-6381 HPHONE_EMPTY HSTREET_CHARLES_ST HCITY_PORT_WASHINGTON HSTATE_NY HZIP_11050 DLSTATE_LA

RECORDID_99313 SEX_M FNAME_JOSEPH DATE_1992 SSN_054-91-6381 HPHONE_929-914-1128 HSTREET_CHALES_ST HCITY_PORT_WASHINGTON HSTATE_NY HZIP_EMPTY DLSTATE_LA

-0.070478 -0.100994 -0.143470 0.131677 0.114188 0.313440 -0.414410 ......-
0.094346 0.000799 0.354441 0.151673 -0.014098 -0.048114 -0.076878 (300 dim vector)

-0.053640 0.039358 -0.173150 0.132419 0.108239 0.260488 -0.348273 ......
-0.060692 0.024584 0.160796 -0.085758 0.297699 0.131804 0.212261 (300 dim vector)

-0.054600 -0.048932 -0.101793 0.064376 0.039635 0.187125 -0.397341 ......
-0.023224 0.004482 0.297173 -0.225032 0.280954 0.105488 0.202494 (300 dim vector)

-0.085362 -0.061280 -0.065528 0.247916 -0.058329 0.169836 -0.414207 ......-
0.121763 -0.093890 0.403218 -0.230695 0.079132 0.132205 -0.179551 (300 dim vector)

```
val result_df = sparkSession.sql("""
    SELECT X.recordid,
    FROM Index_View X
    WHERE
    ORDER BY proximityValue DESC """)
```

← 502

+------+----------------+
|recordid|proximityValue|
+------+----------------+
|99893 |0.91848934    |
|99657 |0.9132938     |
|99459 |0.91195434    |
|99806 |0.91182303    |
|99470 |0.9091263     |
|99451 |0.90874356    |
|99473 |0.9077441     |
|99848 |0.90767205    |
|99807 |0.9066281     |
|99584 |0.90551805    |
|99579 |0.9054213     |
|99873 |0.90515095    |
|99532 |0.9041771     |
|99634 |0.90395516    |
|99507 |0.9037702     |
|99879 |0.90275127    |
|99654 |0.9024025     |
|99602 |0.90215147    |
|99959 |0.9016441     |
|99489 |0.90158814    |
|99644 |0.9012501     |
|99915 |0.9007941     |
|99528 |0.900701      |
|99703 |0.9006128     |

VECTOR EMBEDDING MODELS FOR RELATIONAL TABLES WITH NULL OR EQUIVALENT VALUES

BACKGROUND

This invention relates generally to databases and, more specifically, to semantic-based queries using embedding vector representation.

A computer database is a set of data stored on a computer in a structured or semi-structured format. The database model of data storage organizes large amounts of data in such a way that the data can be efficiently accessed, managed, and updated.

One type of a computer database is a relational database, which provides certain relationships between data to increase the speed and efficiency over a regular database. A relational database is typically structured as one or more tables of rows and columns. The rows are defined as tuples and track entities of interest, and the columns are defined as attributes of those entities of interest. For example, a row or tuple can correspond to an employee, a patient, a physical asset, a location, or other entities. Each column or attribute defines an aspect of the entity represented in the relational database.

A query language may be used to manage data in a relational database. Managing data may include storing information to or retrieving information from, or otherwise manipulating (e.g., via sorting, updating, comparing, and other operations) the relational database. One example of a query language is Structured Query Language (SQL).

SUMMARY

Embodiments of the invention provide for methods, computer program products, and systems for processing records of a structured or semi-structured database.

According to an embodiment of the invention, the method imputes, to a null value of a first token of a first database record, a non-null value of a second token in a second database record.

According to a related embodiment, the method replaces the null value of the first token with a non-null value of the second token.

According to a related embodiment, the imputing is performed in response to determining that the second record is similar to the first record.

According to a related embodiment, the method determines that the second record is similar to the first record is based on comparing semantic vectors of tokens of the first database record to semantic vectors of tokens of the second database record.

According to a related embodiment, semantic vectors of the first and second database records are generated using a vector embedding model.

According to a related embodiment, the vector embedding model comprises a neural network trained using training data.

According to a related embodiment, the training data comprises database records appended to include row identifier tags or null value tags or both.

According to a related embodiment, a null value of a token comprises:
an empty value;
a missing value;
a placeholder value;
a predefined value; or
a default value,
wherein the null value signifies the lack of specific attribute information for a given token.

According to a related embodiment, the method generates a semantic vector for the first token based on determining that the first token has a null value and queries an embedding database to find one or more records similar to the first record. The second token in a second database record is selected from the one or more similar records.

According to an embodiment of the invention, a computer system for processing records of a structured or semi-structured database, comprises one or more processors; one or more tangible storage media storing one or more programming instructions for execution by the one or more processors to perform a method, the programming instructions comprising instructions to performs steps of the methods described above.

According to an embodiment of the invention, a computer program product for processing records of a structured or semi-structured database, comprises one or more tangible storage media storing programming instructions for execution by one or more processors to perform a method. The programming instructions comprise instructions for performing the methods described above.

According to an embodiment of the invention, a method for reducing or eliminating an impact of null value tokens in records of a structured or semi-structured database tags one or more null value tokens in records of a structured or semi-structured database with a tag signifying a null value; and generates semantic vectors for non-null value tokens using only non-null value neighbor tokens.

According to a related embodiment, the method finds, for a given record, similar records based on querying the generated semantic vectors.

According to a related embodiment, a null value of a token comprises:
an empty value;
a missing value;
a placeholder value;
a predefined value; or
a default value,
wherein the null value signifies the lack of specific attribute information for a given token.

According to yet other embodiments of the invention, a computer system and a computer program product are provided for executing programming instructions to perform steps of the above methods.

BRIEF DESCRIPTION OF THE SEVERAL VIEWS OF THE DRAWINGS

FIG. 2 is an illustrative example of entries of database 108 of FIG. 1, according to an embodiment of the invention.

FIG. 3 is an illustrative example of training database 110 of FIG. 1, according to an embodiment of the invention.

FIG. 5 is an illustrative example of a query 502 using embedding database 112 of FIG. 1, according to an embodiment of the invention.

DETAILED DESCRIPTION

Figure 1:
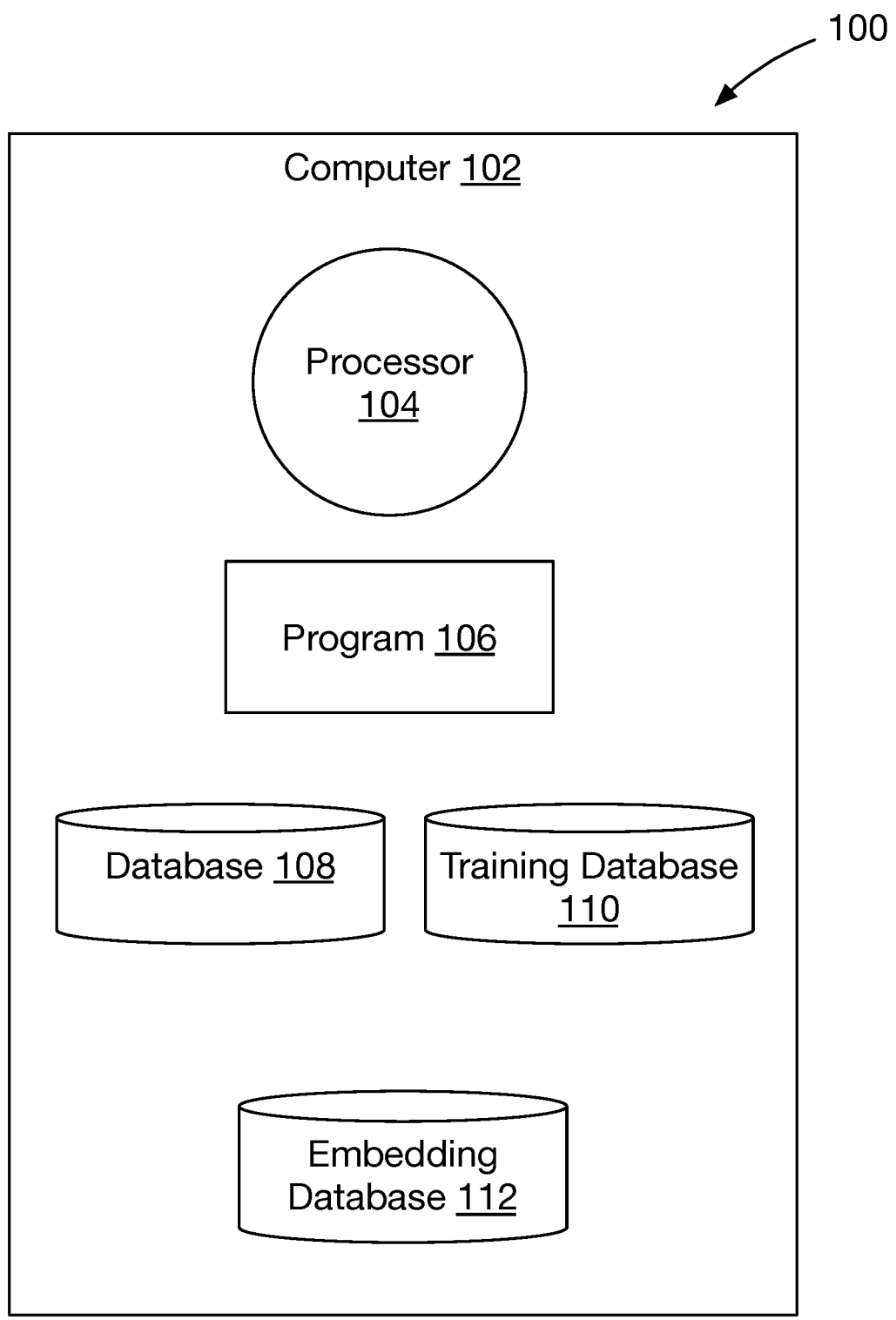
FIG. 1 is a functional block diagram of an illustrative computing environment 100 for generating vector embeddings, according to an embodiment of the invention.

It should be noted that while some embodiments of the invention are described in connection with a relational database, the inventive concepts disclosed herein are applicable to other databases and other information types, such as multidimensional online analytical processing (MOLAP), JavaScript Object Notation (JSON), eXtensible Markup Language (XML), comma-separated value (CSV) files, spreadsheets, resource description framework (RDF) documents and multi-modal databases (e.g., image and text), to name a few.

An example of a relational database is a table storing information about persons. Each table tuple or row may correspond to a person, and each table column may correspond to an attribute (such as the person's name, contact information, demographic information, and other information).

A task of interest in managing a relational database, according to an embodiment of the invention, is to perform data imputation to build, complete, or correct records stored in a database, including records that have null values. Data imputation may be performed by identifying, relative to a given record under consideration (having one or more null values), one or more similar records (for example, in the same database) whose attributes can be imputed to the null values of the given record; i.e., a process by which null values can be inferred and filled in based on attributes of other records deemed to be similar to the given record. The task of imputing data is a technical and non-trivial computing challenge.

A further task of interest in managing a relational database, according to an embodiment of the invention, is to determine similarity between various records (rows or tuples) of the relational database; or between various records of two relational databases. Finding similar records correctly enables proper data imputation. In the example given above, a task of interest may be, for a given record (e.g., a record of a person) listed in the relational database, finding other records that are most similar to it. The task of determining most similar records is a technical and non-trivial computing challenge.

A further task of interest in managing a relational database, according to an embodiment of the invention, is to identify, and to remove or consolidate, duplicate records. For example, two records may exist in the relational database for the same person (for example, the records may have been created by combining two different databases), but the records may not have identical information. The task of determining duplicate records is a technical and non-trivial computing challenge.

The following discussion illustrates these technical and non-trivial challenges, explains why the prior art is limited in addressing them, and highlights advantages of practicing embodiments of the invention when addressing these challenges.

Structured and semi-structured databases may be processed in a number of ways, according to embodiments of the invention.

In one example, the processing includes generating a set of token sequences for at least a portion of a database, wherein each token in a sequence represents a respective database entity of the database; assigning, for each token in the set of token sequences, at least one corresponding vector from a set of vectors of a same dimension, wherein the at least one corresponding vector encodes relationships between the database entity of a token and other database entities of other tokens of the set of token sequences; and extracting, using a query language, information from the database based at least in part on the relationships encoded by the assigned vectors.

In another example, the processing adapts a relational database containing multiple data types. Non-text tokens in the relational database are converted to a textual form. Text is produced based on relations of tokens in the relational database. A set of pre-trained word vectors for the text is retrieved from an external database. The set of pre-trained word vectors is initialized for tokens common to both the relational database and an external database. The set of pre-trained vectors is used to create a cognitive intelligence query expressed as a structure query language (SQL) query. Content of the relational database is used for training while initializing the set of pre-trained word vectors for tokens common to both the relational database and the external database. The first set of word vectors may be immutable or mutable with updates controlled via parameters.

In yet another example, the processing adapts a relational database containing image data types. At least one image identifier in the relational database is converted to a token form. Text is produced based on relations of tokens in the relational database. A set of word vectors is produced based on the text. A cognitive intelligence query expressed as a structured query language (SQL) query may be applied to the relational database using the set of word vectors. An image identifier may be converted to token form by converting the image to a tag, by using a neural network classification model and replacing the image identifier with a corresponding cluster identifier, by binary comparison or by a user-specified similarity function. An image identifier may be converted to a plurality of textual forms using more than one conversion method.

In yet another example, the processing adapts a relational database containing numeric data types. At least one numeric token in the relational database is converted to a textual form. Text is produced based on relations of tokens in the relational database. A set of word vectors is produced based on the text. A cognitive intelligence query, expressed as a structured query language (SQL) query, may be applied to the relational database using the set of word vectors. At least one numeric token in the relational database may be converted to a typed string comprising a heading for a column in the relational database for which the token appears and the numeric value. Converting at least one numeric token in the relational database may comprise clustering tokens in a column of the relational database using a clustering algorithm nd replacing each token in the column by a cluster identifier.

In yet another example, the processing includes receiving, by a processor system, a collection of information. The collection of information includes private information and non-private information. The processing also includes producing a plurality of vectors to represent the private information and the non-private information. The plurality of vectors corresponds to encoded representations of the private information and the non-private information. The processing also includes publishing at least a portion of the collection of information and the corresponding vectors.

As illustrated in the above examples, performing many tasks of interest or more generally, managing or processing relational databases (among other data structures) involves vector embedding.

According to one definition, vector embedding is a technique that maps words or phrases in a vocabulary to a vector of real numbers. A benefit of using vector embedding is to define the semantic and/or syntactic meaning of a token (a word or a phrase) in a way that can be systematically processed by natural language processing systems. In this technique, the vector representation of the word or phrase is influenced by the token's context, i.e., its neighboring words or phrases. The span of the neighboring words is a configurable parameter. A neural network (which also can be referred to as a training model) can be trained using training data to generate semantic vectors by taking a string as its input to generate a vector representation for each token in that string. The string may be, for example, a sentence. One set of models used to generate vector embeddings using this technique is word2Vec.

According to another definition, Distributed Language Embedding refers to assigning a vector to each word, term, concept, or more generally item of data, where the vectors indicate various aspects of the associated words, including semantic "closeness". Embodiments described herein may perform various operations on text entities in structured or semi-structured databases. The term "text entity" refers to some discernible item (data) appearing in a database (or some external source), such as a word, a number, a meaningful short sequence such as "Theory of Relativity". A "word vector" is a vector representation of words in a language. The methods for obtaining these vector representations range from "brute force" learning by various types of neural networks, to log-linear classifiers and to various matrix formulations, such as matrix factorization techniques. Word2vec, for example, produces vectors that capture syntactic as well as semantic properties of words. Word2vec scans a corpus (text) to generate vector representations for each word in the document. A word vector is usually of a low dimension (about 100-300) and represents the word. The vectors can be used to compute the semantic and/or grammatical closeness of words as well as test for analogies, e.g., "a king to a man is like a queen to what?" (answer: queen) by using vector algebra calculations.

According to yet another definition, database entities, such as a word, a number, a field (column) of a row, a whole table row (i.e., tuple) or even a whole relation, are each associated with a vector that captures the database entity's inter-relationships with all other such entities. The closeness of such entities may be determined by simple vector operations. Further, the learning (or training) of the vectors may be accomplished via Machine Learning (ML) techniques and may be carried out on entity sequences that are derived from the database itself. This provides two perceptions of a database: the typical relational one and the text one. The text perception of the database may be analyzed, and a low dimensional, e.g. 200, vector representation may be assigned to each token. According to some techniques, tokens that co-occur often are assigned vectors whose cosine distance is relatively high. The vectors may also be used in checking analogies using simple vector operations. A token may be defined as a sequence of "characters" with no intervening blanks. Each token represents a text entity, and the entities relate to each other. This relationship may be expressed numerically, e.g. $cos(e1,e2) > 0.5$. Here cos is the cosine distance between two vectors. The relationship may also be expressed verbally on a scale, for example very_strong, strong, moderate, weak, very_weak, e.g. strong(e1,e2), which enables defining the numeric values separately, e.g. very_strong=0.95. For example, understanding the relationship between the two text entities 'John' and 'New York' includes deriving the tokens for the text entities, such as V_John and V_New_York, and performing an algebraic operation on the two vectors, for example cosine distance. If the cosine distance between V_John and V_New_York is high (i.e. closer to 1) than the two text entities are closely related; if the cosines distance is low (i.e. closer to −1) the two entities are not closely related.

According to yet another definition, in vector embedding, a d-dimensional vector space is fixed. Each word in a text corpus (e.g., collection of documents) is associated with a dimension d vector of real numbers. The assignment of words to vectors should be such that the vectors encode the meaning of the words. Ideally, if two words are closely related (i.e. have similar meaning), their vectors should point in similar directions. In other words, the cosine distance between their vectors should be relatively high. By closely related words we mean words that appear together often in the text corpus. By appear together, we mean within close proximity. Conversely, if words are unrelated, the cosine distance between their vectors should be relatively small. Some refinements of the calculation of closeness weigh the proximity and/or consider grammar rules.

Vectors may be produced by either learning on the database itself or using external text, or vector sources. In the relational database context, one way of generating vectors is to apply the vector embedding method to a token sequence generated from the database: each row would correspond to a sentence and a relation would correspond to a document. Thus, vectors enable a dual view of the data: relational and (meaningful) text. Vector embedding then may extract latent semantic information in terms of word associations and co-occurrences and encode it in word vectors. Thus, the vectors capture first inter- and intra-attribute relationships within a row (sentence) and then aggregate these relationships across the document to compute the collective semantic relationships. The encoded semantic information then may be used in querying the database.

A common issue in the above-described functions and processes is that database records often contain null values. For purposes of embodiments of the claimed invention, it shall be apparent to a person of ordinary skill in the art that the terms empty, null, missing, placeholder, or other predefined or default value signifying the lack of specific attribute information for a given entity or record, are contemplated without diverging from the spirit and scope of the claimed invention. A common functional definition of these terms, in the context of embodiments of the present invention, is that for a given record in a database, these values do not signify actual attributes of the entity corresponding to that record. Instead, the values signify the immediate unavailability of attribute information.

The above-described functions may be better performed if the null values are replaced with actual values using data imputation. Additionally, it may be desirable to minimize the undue influence of null values when performing data imputation or other data processing tasks.

More specifically, in the context of structured and semi-structured databases, a semantic vector is more useful when it is generated using actual attributes of a record, rather than null values. When actual attributes are not available in a given record (i.e., the value is null), they can be imputed from other similar records, by practicing embodiments of the claimed invention. Additionally, semantic vectors can be made even more useful by minimizing the undue influence of null values where these values cannot be imputed from other records.

To briefly summarize, the challenges presented by null values arise because, in a vector embedding process applied to a relational database, each row may be treated as a sentence and may be provided as input to the process (e.g., an input to a neural network). A vector can be generated for the words or phrases in the row. However, the row may have many null values. A word's vector is influenced by the null values in its neighborhood, and falsely appears to be similar to other tokens with null values in their neighborhoods.

There exist, therefore, at least two challenges in performing the tasks of interest discussed above: data imputation for a given null value in a given record (i.e., if an attribute value is null, what are the records most similar to that attribute's record, from which the attribute be copied); and generating semantic vectors based on records that have one or more null values. It is an object of at least one embodiment of the invention to address one or both of these challenges.

With respect to the first challenge; for a given null value in a given record, it is not readily apparent what other record is similar enough to the given record and therefore suitable as a source for data imputation for the given null value. This occurs because, in the prior art, null values do not have corresponding semantic vectors created for them, and because other null values improperly influence semantic vectors for both the given null value and null values of other records. The more null values there are in a record, the more similar it appears to be to other records having null values. However, this similarity is not meaningful, because the two records are similar only in so far as both have null values, and not because they otherwise convey information (e.g., attributes) for the same entity.

With respect to the second challenge, the improper influence of null values in a relational database on the vector output of a neural network training model occurs because of an underlying assumption of this process; namely, that words used in the same manner and/or with similar contexts likely have similar meanings. This assumption is believed to produce reliable assessments of semantic similarity in many use cases; but falls apart in many cases in relational databases with null values, since many attributes are identified as similar simply because they all are surrounded by the same null value.

There is a need, therefore, for inventive methods, systems, and computer program products, that reliably impute data for null values in database records and generate vector embeddings free from improper or undue influence of null values. It is therefore an object of at least some embodiments of the disclosed invention to provide one or more of these functions.

It shall be apparent to a person of ordinary skill in the art that the disclosed invention has applicability to more than just relational databases, and extends to data imputation and vector embedding processes for data stored in any structure where some of the data includes null that may be imputed from other records.

Embodiments of the invention will now be described in greater detail in reference to the various Figures.

FIG. 1 is a functional block diagram of an illustrative computing environment 100 for generating vector embeddings, according to an embodiment of the invention. Referring now to FIG. 1, computing environment 100 includes computer 102, whose general structure and components may be those described in connection with FIG. 9, below.

Computer 102 includes a processor 104, a program 106, a database 108, a training database 110, and embedding database 112.

Processor 104 generally processes programming instructions of program 106 to perform one or more methods. Program 106 operates on data stored (or to be stored) on database 108, training database 110, and embedding database 112; each database stores one or more records, and each record corresponds to an entity, and each record has one or more attributes. Program 106 and the databases are stored on a tangible storage medium of computer 102. It shall be apparent to a person of ordinary skill in the art that although one computer, one processor, one program (and some databases) are depicted in FIG. 1, these components can be distributed among more than one computing device, and may be provided via cloud computing or other distributed computing models, without diverging from the spirit or scope of the claimed invention.

More particularly, program 106 performs vector embedding functions (as described in connection with FIGS. 2-4) and query functions (as described in connection with FIG. 5), among others.

Database 108 generally includes data on which various tasks of interest, as described above, are to be performed. For example, database 108 is a table whose rows represent persons and whose columns represent attributes of those persons. Some of those attributes may be missing in some of the rows (or may be tagged as NULL, EMPTY, or other values). An example of entries of database 108 is provided in FIG. 2, below.

Training database 110 generally includes data generated by program 106 to generate vector embeddings according to embodiments of the invention; such as those in embedding database 112.

Records stored in embedding database 112 generally are data that program 106 generates by processing records of training database 110 (in other words, program 106 processes training data to generate semantic vectors).

FIG. 2 is an illustrative example of entries 200 of database 108 of FIG. 1, according to an embodiment of the invention. In the depicted example, database 108 is a comma separated values (CSV) relational database whose entries 200 include a header row (not shown in FIG. 2) corresponding to attributes of persons, and one or more additional rows (shown in FIG. 2) corresponding to records that store actual attributes of persons. Records in database 108 may have incomplete, incorrect, or conflicting attribute information that unduly influences querying and other operations on the database, including the vector embedding process to be performed on database 108. This is a problem.

In fact, entries 200 in the depicted example are for the same fictitious person, "JOSEPH ROBERTS". However, the records are not identical as some may be have incomplete, incorrect, or conflicting information.

The attributes for the first record in this example are: unique ID information (e.g., "2e92d2e-761e-44ab-a3c3-4ef86a04300f,MDMPER,60017,99310"), gender (e.g., "M" for male), birthday (e.g., "28/8/1992"), social security number (e.g., "054-91-6381"), telephone number (e.g., "929-914-1128"), address (e.g., "15 Charles ST, Port Washington, N.Y., 11050"), geographical coordinates (e.g., "11050, 40.754757 −73.601772"), and other information. However, some of this information is missing from other records.

Notice, for example, that the first entry (having record ID 99310) has values "M" and "JOSEPH" for attributes SEX and FNAME. However, the second, third, and fourth entries (record IDs 99311, 99312, and 99313, respectively) have empty values for these two attributes.

In line with the tasks of interest described above, it is desirable to perform data imputation to find appropriate values to replace these empty values by finding the most similar records that may have actual values for one or more of these attributes.

As described more generally above, generating vector embeddings of data in database 108, without processing according to embodiments of the claimed invention, have limited utility because they do not fill in data gaps, and because semantic vectors for non-null data can be unduly influenced by null values.

It is therefore desirable to process data of database 108 to fill in data gaps (data imputation) and to lessen or eliminate the improper influence of null values on semantic vectors for the data in database 108. At least some methods are provided in FIGS. 6-9 that illustrate how to perform these functions. An example of training data generated and/or used by these methods is described in FIG. 3.

FIG. 3 is an illustrative example of training database 110 of FIG. 1, according to an embodiment of the invention. Entries 300 of training database 110 are generated by applying method 600 of FIG. 6 (as an example) to entries 200 (FIG. 2) of database 108. Details of this process are described in connection with FIG. 6. It can be observed, here, that values of entries 300 are tagged with their attributes: RECORDID (i.e., "record ID"), SEX (or gender), FNAME (first name), LNAME (last name), DATE, SSN (social security number), HPHONE (home phone number), HSTREET (home street address), HCITY (home city), HSTATE (home state), HZIP (home sip code), DLSTATE (driver's license state).

Observe that for the second entry in the set of entries 300, the FNAME field is empty (in entries 200 of FIG. 2, this entry appears as " . . . M,ROBERTS . . . ", where there is no value between "M" and "ROBERTS").

Observe also that the "EMPTY" tag appears throughout the various entries 300 where information is missing. This is an example of null gaps in data that can be filled using data imputation, and an example of null values that if unfilled, can unduly influence semantic vectors. If a multidimensional vector is generated based on shared neighboring tokens, entries 300 will yield a high rate of false positives (of positive similarity) because of the EMPTY tags. This is a problem.

Figure 4:
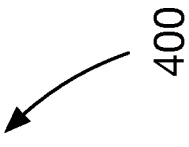
FIG. 4 is an illustrative example of an embedding database 112 of FIG. 1, according to an embodiment of the invention.

FIG. 4 is an illustrative example of an embedding database 112 of FIG. 1, according to an embodiment of the invention. FIG. 4 depicts example vectors 400 generated using entries 300 of FIG. 3. Semantic vectors 400 are generated, using embodiments of the invention, to fill in data gaps and to reduce or eliminate the undue influence of null values.

FIG. 5 is an illustrative example of a query 502 using embedding database 112 of FIG. 1, according to an embodiment of the invention. In the depicted example, query 502 looks for vectors in embedding database 112 that are most similar to the vector with RecordID 99728. In the depicted example, results 504 show that the record with RecordID 99797 is most similar to RecordID 99728.

By practicing embodiments of the invention, the most similar records are correctly identified and serve as sources for data imputation. Additionally, the influence of null values is reduced or eliminated.

Figure 6:
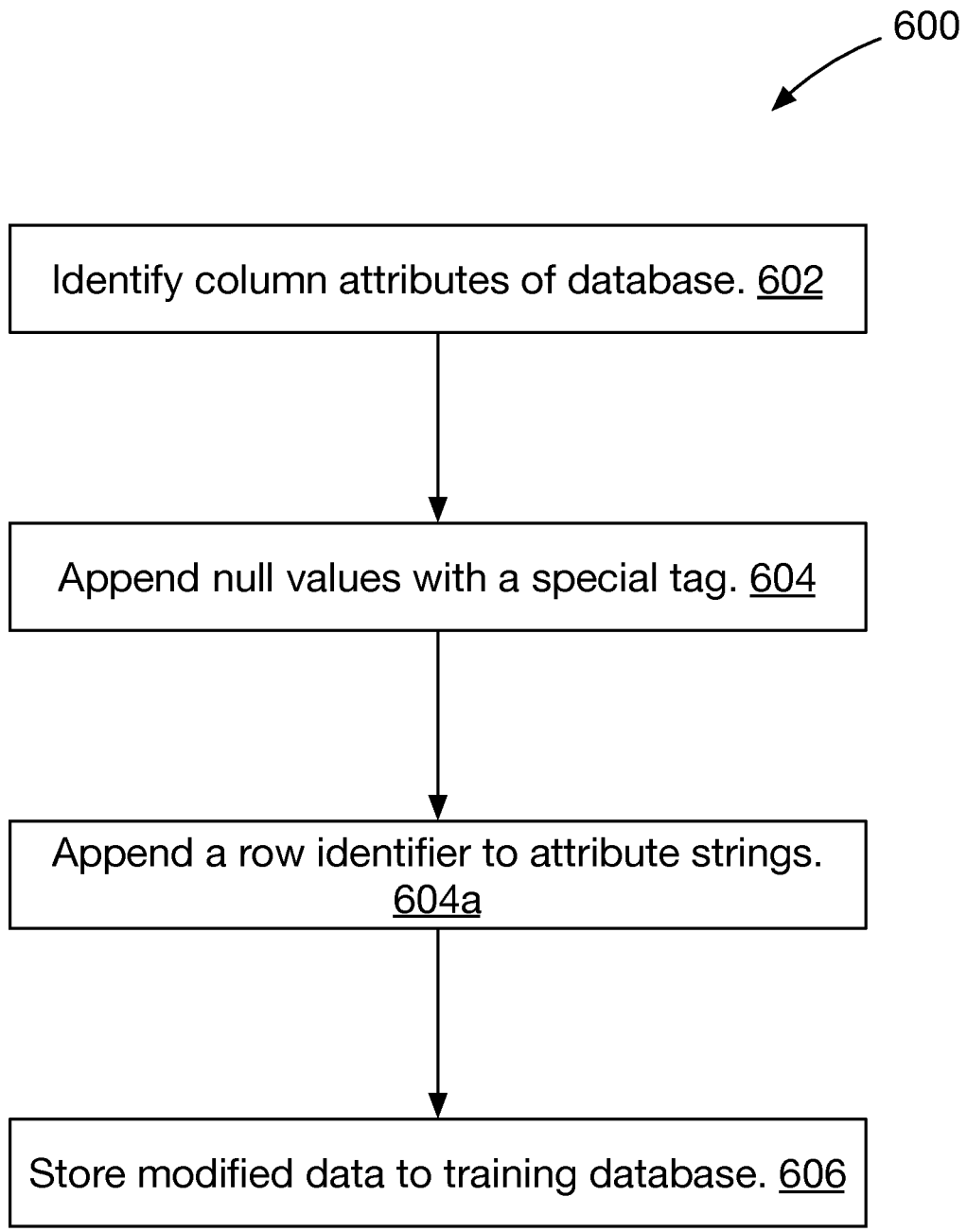
FIG. 6 is an illustrative method 600 for generating records of training database 110 of FIG. 1 using records of database 108, according to an embodiment of the invention.

FIG. 6 is an illustrative method 600 for generating training database 110 using entries of database 108, of FIGS. 1 and 2, according to an embodiment of the invention. Referring now to FIGS. 1, 2, and 6, programming instructions of program 106 are executed by processor 104 to perform steps of method 600. Method 600 generally may operate to create training datasets (stored in training database 110) using database 108 having null values.

Program 106 identifies (step 602) column attributes of database 108.

Program 106 appends/tag (step 604) null (missing, empty, default, placeholder, etc.) values in database 108 with a special tag; for example, "_EMPTY".

Program 106 optionally or alternatively appends (step 604a) a row identifier to the attribute strings. This enables embodiments of the invention to differentiate a particular entry or cell value in a table from other null value cells in a column, by appending or assigning a row identifier to the null value; otherwise, all null values in a particular column may appear indistinguishable when performing certain processing steps. For example, for a given record under analysis (whose null values are to be replaced using data imputation), once similar rows are identified, we can use either value based voting (just use the most common value from the candidate set) or other techniques such as mean or median of candidate values.

Program 106 stores (step 606) the modified data to training database 110. This training data can then be used to perform data imputation.

Figure 7:
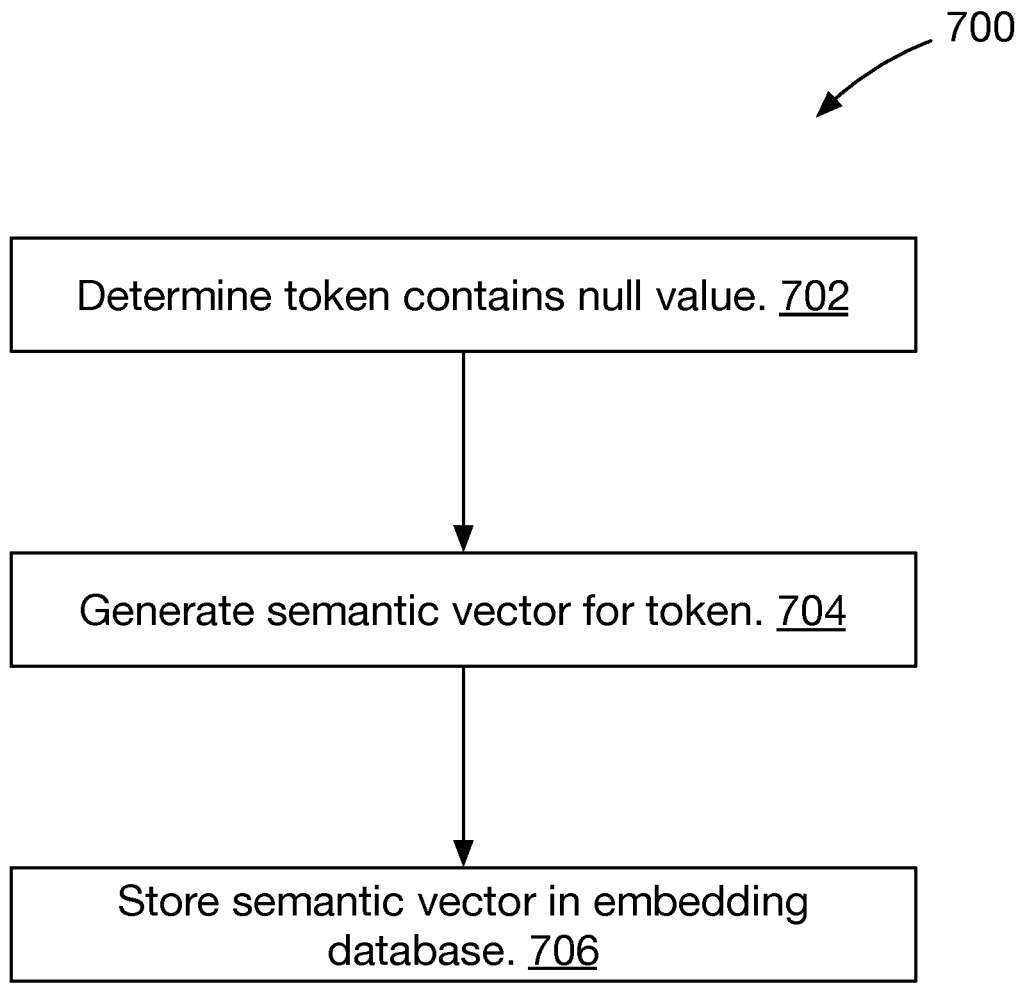
FIG. 7 is an illustrative flowchart of a method 700 for generating records of embedding database 112 of FIG. 1 using records of training database 110, according to an embodiment of the invention.

FIG. 7 is an illustrative method 700 for generating records of embedding database 112 of FIG. 1 using records of training database 110, based on outputs of method 600 of FIG. 6, according to an embodiment of the invention.

Referring now to FIGS. 1, 2, 3 and 6, and 7, programming instructions of program 106 are executed by processor 104 to perform steps of method 700. Method 700 generally may operate to build semantic vectors for training data with "_EMPTY" (or equivalent tags) in training database 110; i.e., data imputation.

Program 106 determines (step 702) that a token, for which a semantic vector is being generated, contains a null value. The token is part of a "sentence" (for example, a record or row of training database 110). It is desirable for method 700 to generate, as an output, a semantic vector for the token.

For example, program 106 determines (step 702) that the SEX_EMPTY and FNAME_EMPTY tokens in some entries 300 of training database 110 contain an "_EMPTY" tag (namely, the second, third, and fourth entries). The determination (step 702) may be performed token-wise; i.e., while there are tokens to be processed (to generate a semantic vector) and for each such token, program 106 determines (step 702) whether the token has the "_EMPTY" tag.

Program 106 generates (step 704) a semantic vector for each token having an "_EMPTY" tag as determined (step 702) above. Generating the semantic vector may be performed using a neural network.

Program 106 stores (step 706) the semantic vector generated (step 704) in embedding database 112.

Figure 8:
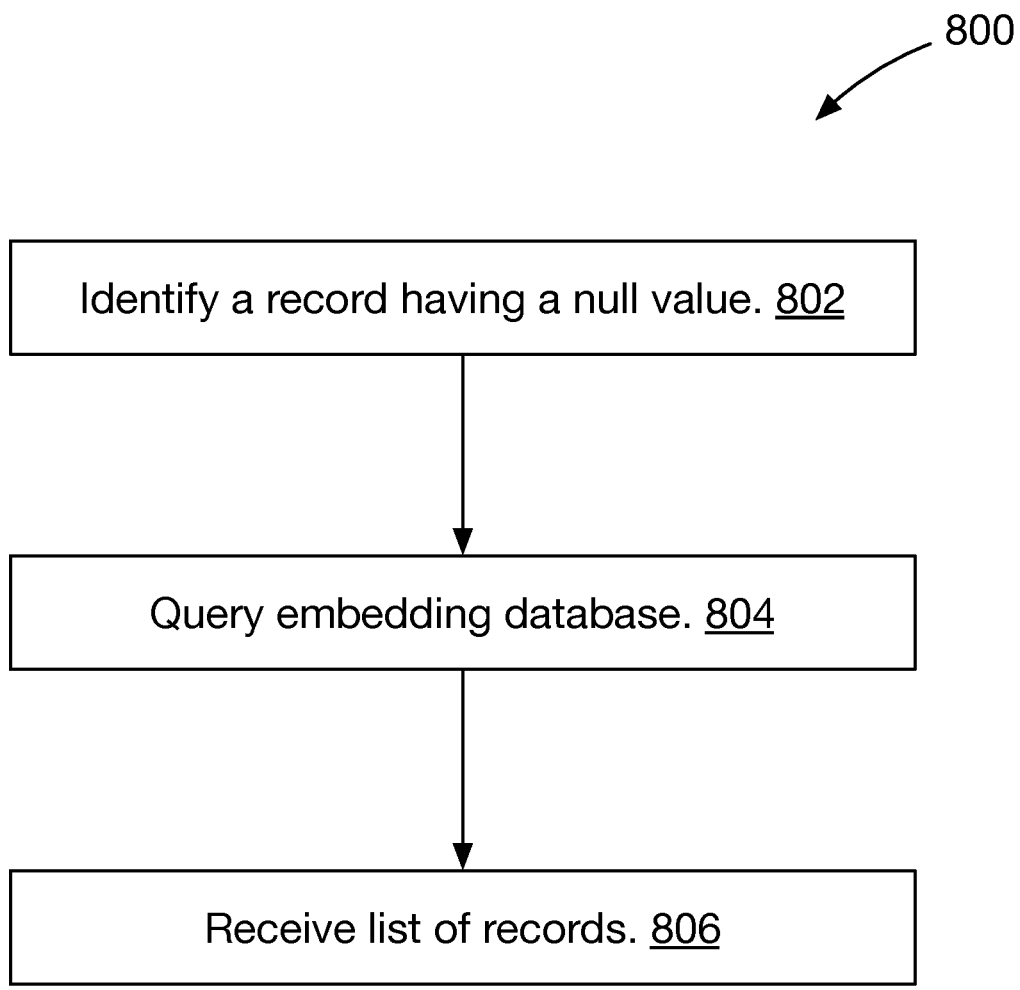
FIG. 8 is an illustrative flowchart of a method 800 for querying records of database 108 of FIG. 1 using records of embedding database 112, according to an embodiment of the invention.

FIG. 8 is an illustrative flowchart of a method 800 for querying records of database 108 of FIG. 1 using records of embedding database 112, according to an embodiment of the invention.

Referring now to FIGS. 1, 2, 3, 5, and 8, programming instructions of program 106 are executed by processor 104 to perform steps of method 800. Method 800 generally may operate to query, for a given record in database 108, the most similar other records in database 108 (or in another database). One purpose for executing method 800 is to perform tasks of interest described above. For example, method 800 may be executed so as to find, for a given record in database 108 having a null value, a most similar other record whose non-null data can be imputed to the null data of the given record.

Accordingly, program 106 identifies (step 802) a record (or token within a record) in database 108 having a null value. For example, program 106 identifies the second entry among entries 200 (FIG. 2) as having null values for SEX and FNAME attributes. Alternatively, program 106 may perform the identification (step 802) using entries 300 (FIG. 3) of training database 110.

Based on the identified record, program 106 queries (step 804) embedding database 112 using record information of the record identified (step 802) above. For example, program 106 queries (step 804) embedding database 112 using SQL query 502 (FIG. 5).

Based on the query (step 804), program 106 receives (step 806) a list of records, which may be sorted according to their similarity to the record identified (step 802) above. The sorted list may be, for example, results 504 (FIG. 5).

Figure 9:
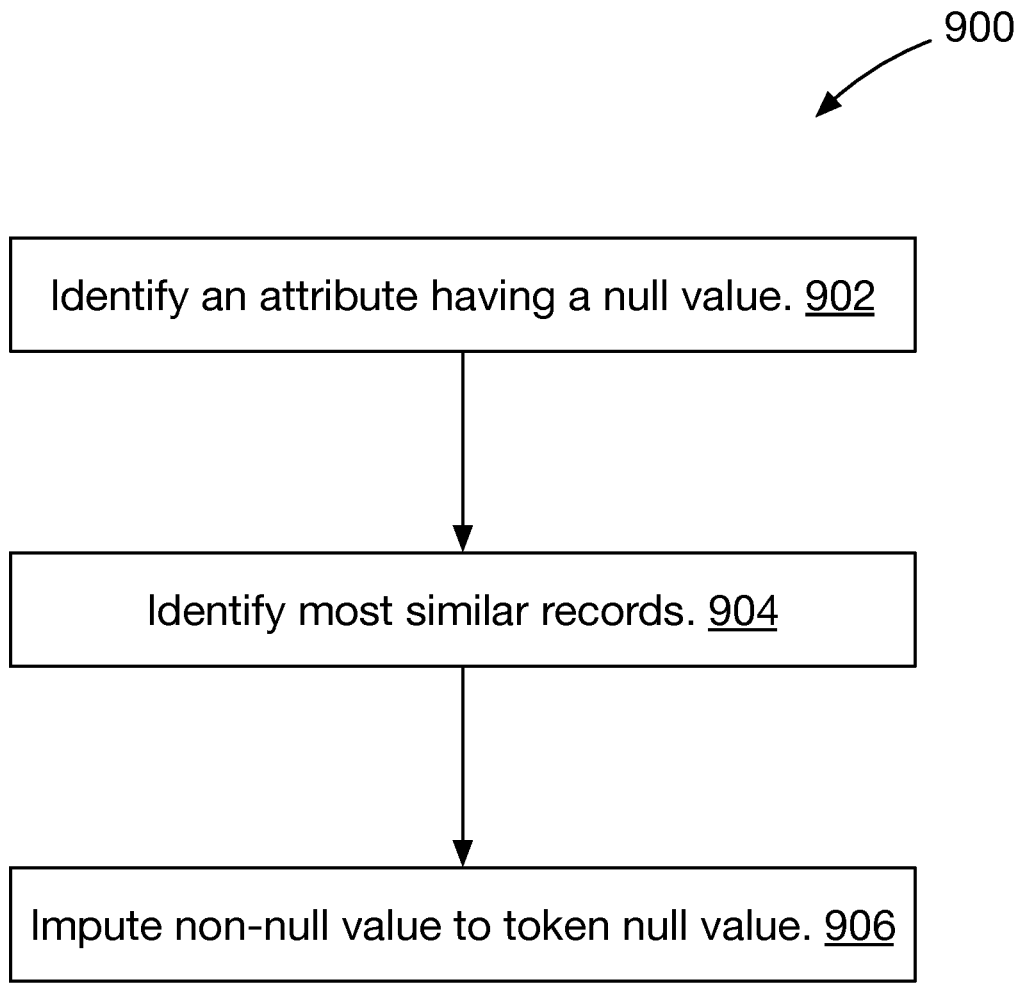
FIG. 9 is an illustrative flowchart of a method 900 for imputing data for null value tokens of database 108, according to an embodiment of the invention.

FIG. 9 is an illustrative flowchart of a method 900 for imputing data for null value tokens of database 108, according to an embodiment of the invention.

Referring now to FIGS. 1, 8 and 9, programming instructions of program 106 are executed by processor 104 to perform steps of method 900. Method 900 may generally operate to impute data for null values in a record of database 108 by querying (method 800) semantic vectors of embedding database 112.

Accordingly, program 106 may identify (step 902) an attribute in a record of database 108 having a null value. The identification (step 902) may be performed by searching for null values in records of database 108 or for "_EMPTY" tags in training database 110.

For a given token identified (step 902) as having a null value, program 106 identifies (step 904) most similar records (e.g., top-K records whose scores are closest to the identified record) in database 108 likely to contain non-null attribute value(s) for the identified (step 902) token. For example, program 106 may perform the identification (step 904) of most similar records by executing method 800.

Based on identifying (step 904) a token with a non-null value, program 106 imputes (step 906) the non-null value of the token identified (step 904) above to the token with a null value identified (step 906) as needing data imputation.

Figure 10:
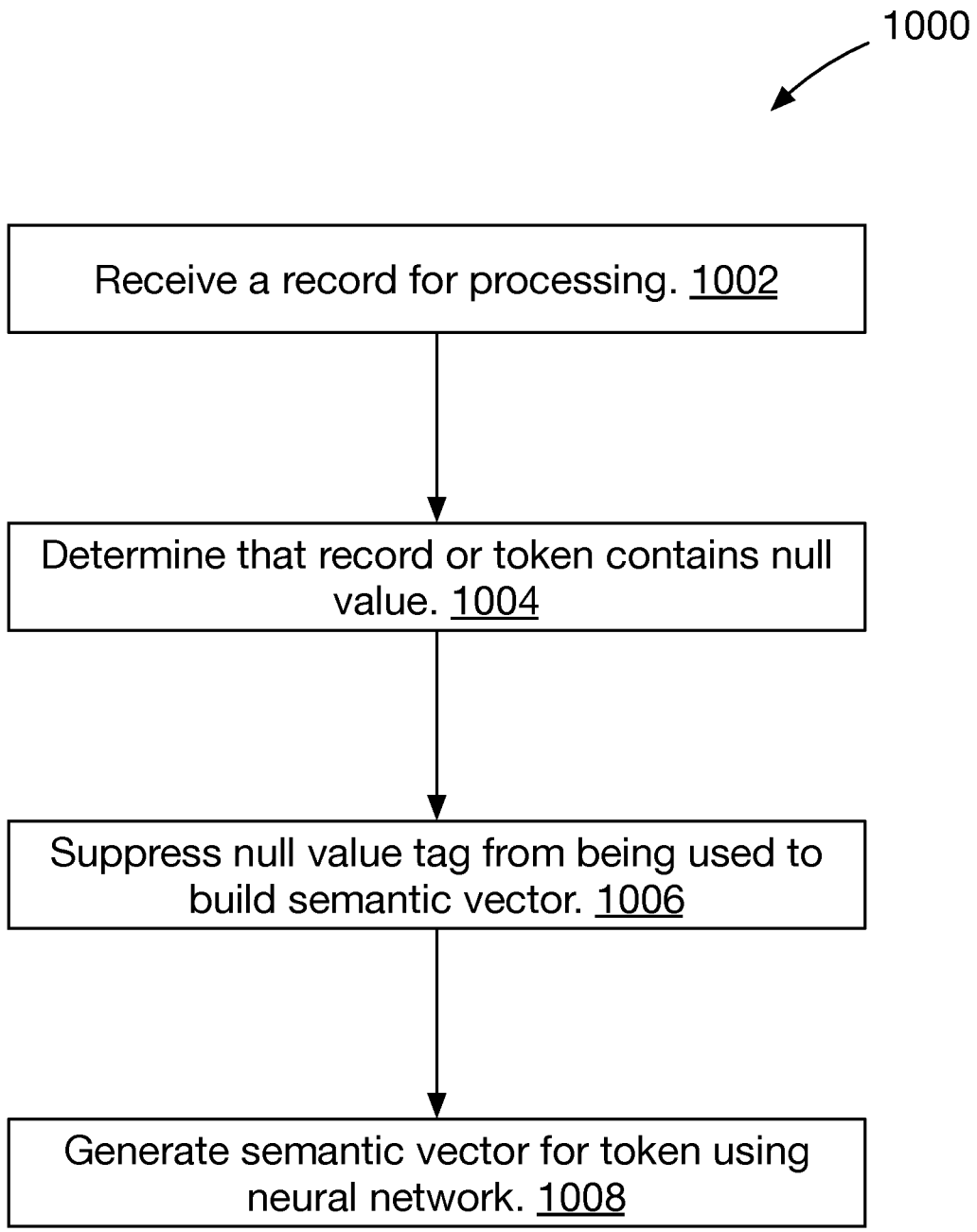
FIG. 10 is an illustrative flowchart of a method 1000 for reducing or eliminating the undue influence of null values on semantic vectors, according to an embodiment of the invention.

FIG. 10 is an illustrative flowchart of a method 1000 for reducing or eliminating the undue influence of null values on semantic vectors, according to an embodiment of the invention.

Referring now to FIGS. 1, 3, and 10, programming instructions of program 106 are executed by processor 104 to perform steps of method 1000. Method 1000 generally may operate to reduce or eliminate the undue influence of null value tokens in generating semantic vectors.

Accordingly, program 106 receives (step 1002) a record or token for processing (to generate a semantic vector). Program determines (step 1004) that the record or token contains a null value (for example, it has an "_EMPTY" tag).

Based on this finding, program 106 suppresses (step 1006) the "_EMPTY" tag from being used in building a semantic vector for entities or tokens in the neighborhood of the "_EMPTY" token. For example, with respect to rows two, three, and four of entries 300 (FIG. 3), generating vector representations of "LNAME_ROBERTS" would not use the "SEX_EMPTY" or "FNAME_EMPTY" values, even though these values appear in the context or neighborhood of "LNAME_ROBERTS". Suppressing the undue influence of empty tags may be accomplished in a variety of manners, including, for example, by filtering out the null value tokens or adjusting the span of the context to exclude the null values tokens. Described another way (and reciting positive steps to be performed), program 106 provides as input (step 1006) to a neural network, for a given token, only neighboring tokens that are not tagged with a null value.

Program 106 generates (step 1008) a semantic vector for the token using the neural network. The semantic vector generated (step 1008) is more useful in performing other tasks of interest because it is not unduly influenced (or is less unduly influenced) by null values.

Figure 11:
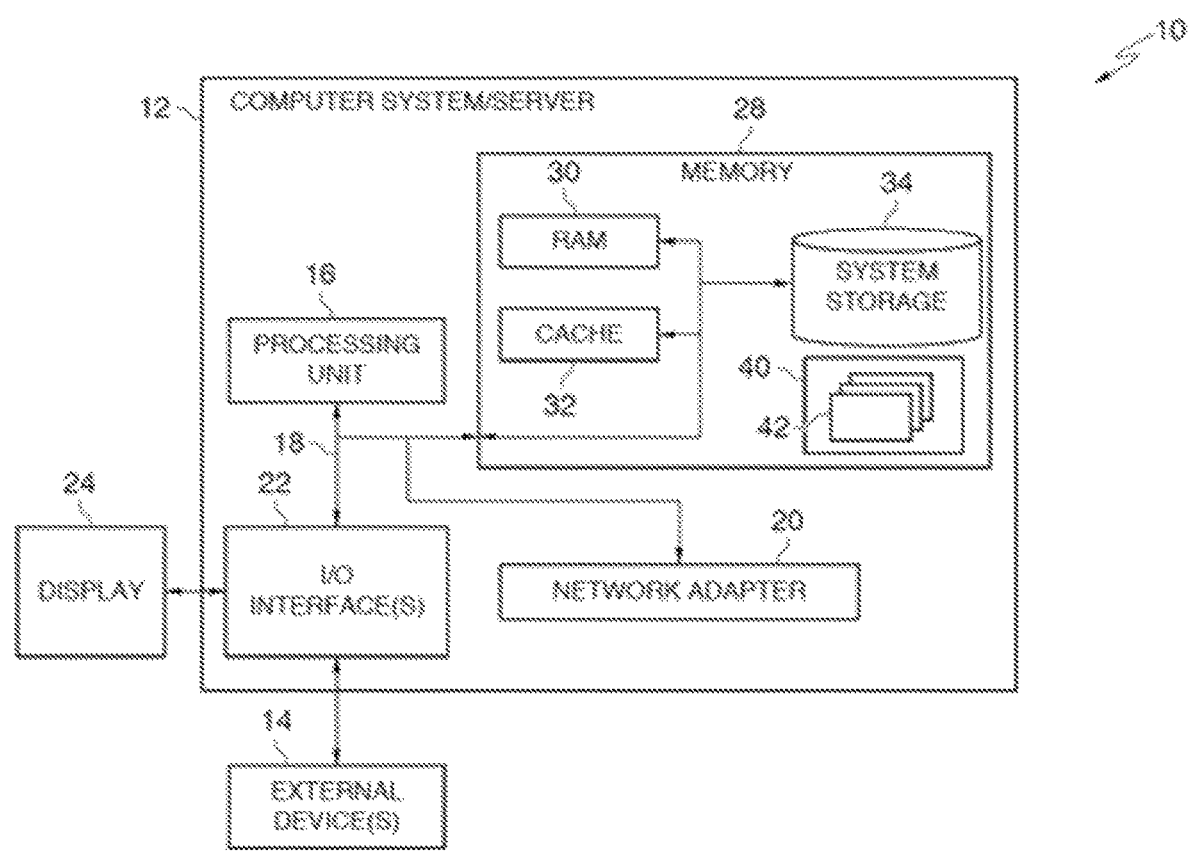
FIG. 11 is a block diagram of an illustrative cloud computing node, according to an embodiment of the invention.

FIG. 11 is a block diagram of an illustrative cloud computing node, according to an embodiment of the invention. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 12:
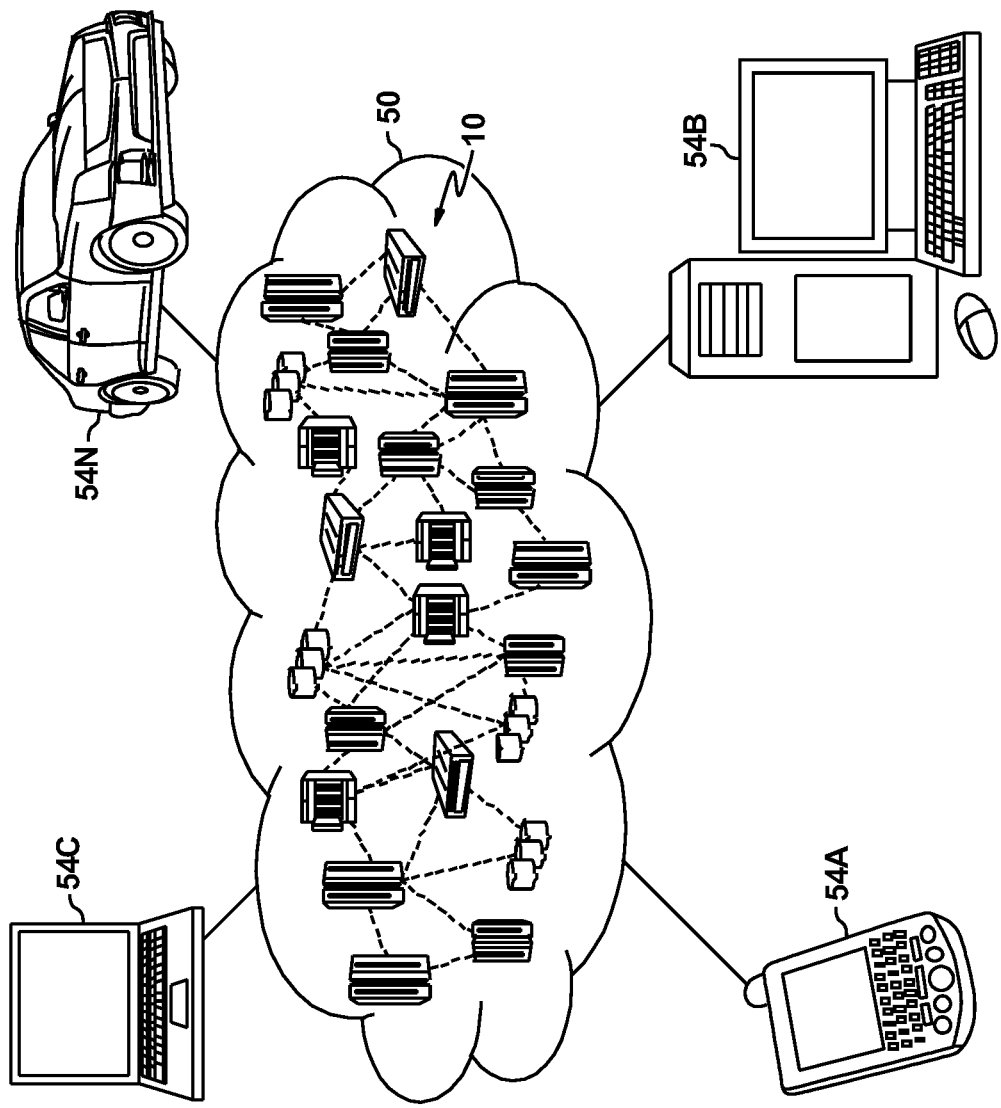
FIG. 12 is a block diagram of a cloud computing environment including the cloud computing node of FIG. 11, according to an embodiment of the invention.

FIG. 12 is a block diagram of a cloud computing environment including the cloud computing node of FIG. 11, according to an embodiment of the invention. Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that cloud computing nodes 10 and cloud computing environment 50 can communicate with any type of computerized device over any type of network and/or network addressable connection (e.g., using a web browser).

Figure 13:
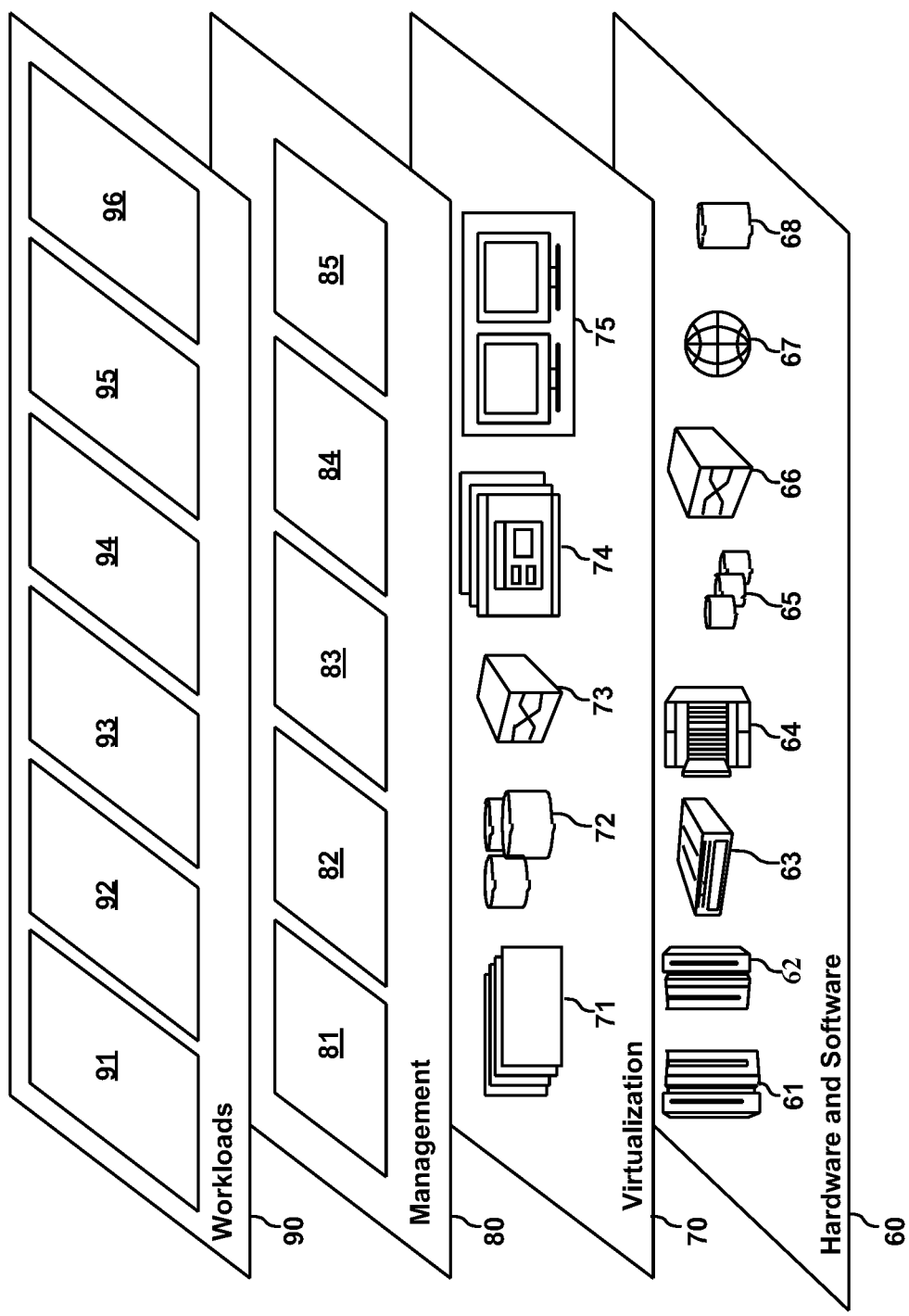
FIG. 13 is a block diagram of functional layers of the cloud computing environment of FIG. 12, according to an embodiment of the invention.

FIG. 13 is a block diagram of functional layers of the cloud computing environment of FIG. 12, according to an embodiment of the invention. Referring now to FIG. 13, a set of functional abstraction layers provided by cloud computing environment 50 is shown. It should be understood in advance that the components, layers, and functions shown in FIG. 14 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and database management 96, including those described in connection with FIGS. 1-10, above.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for processing records of a structured or semi-structured database, comprising:
   generating semantic vectors for tokens associated with the records, wherein generating the semantic vectors comprises determining whether the tokens contain a null value, tagging the tokens containing the null value, and suppressing use of the semantic vectors associated with the tokens containing the null value when generating the semantic vectors for surrounding tokens containing a non-null value;
   imputing, to the null value of a first token associated with the tokens of a first database record, the non-null value of a second token associated with the tokens in a second database record, wherein the imputing comprises,
   determining whether the second database record is similar to the first database record based on comparing the semantic vectors of the tokens associated with the first database record to the semantic vectors of the tokens associated with the second database record, wherein comparing the semantic vectors comprises suppressing the semantic vectors associated with the tokens containing the null value; and
   in response to determining that the second database record is similar to the first database record, replacing the null value of the first token with the non-null value of the second token.

2. The method of claim 1, wherein the semantic vectors of the first and second database records are generated using a vector embedding model.

3. The method of claim 2, wherein the vector embedding model comprises a neural network trained using training data.

4. The method of claim 3, wherein the training data comprises database records appended to include row identifier tags or null value tags or both.

5. The method of claim 1, wherein the null value of a token comprises:
   an empty value;
   a missing value;
   a placeholder value;
   a predefined value; or
   a default value,
   wherein the null value signifies the lack of specific attribute information for a given token.

6. The method of claim 1, further comprising:
   querying an embedding database to find one or more records similar to the first database record,
   wherein the second token in the second database record is selected from the one or more similar records.

7. A computer system for processing records of a structured or semi-structured database, comprising:
   one or more processors;
   one or more tangible storage media storing one or more programming instructions for execution by the one or more processors to perform a method, the programming instructions comprising instructions for:
   generating semantic vectors for tokens associated with the records, wherein generating the semantic vectors comprises determining whether the tokens contain a null value, tagging the tokens containing the null value, and suppressing use of the semantic vectors associated with the tokens containing the null value when generating the semantic vectors for surrounding tokens containing a non-null value;
   imputing, to the null value of a first token associated with the tokens of a first database record, the non-null value of a second token associated with the tokens in a second database record, wherein the imputing comprises,
   determining whether the second database record is similar to the first database record based on comparing the semantic vectors of the tokens associated with the first database record to the semantic vectors of the tokens associated with the second database record, wherein comparing the semantic vectors comprises suppressing the semantic vectors associated with the tokens containing the null value; and
   in response to determining that the second database record is similar to the first database record, replacing the null value of the first token with the non-null value of the second token.

8. The computer system of claim 7, wherein the semantic vectors of the first and second database records are generated using a vector embedding model.

9. The computer system of claim 8, wherein the vector embedding model comprises a neural network trained using training data.

10. The computer system of claim 9, wherein the training data comprises database records appended to include row identifier tags or null value tags or both.

11. The computer system of claim 7, wherein the null value of a token comprises:
    an empty value;
    a missing value;
    a placeholder value;
    a predefined value; or
    a default value,
    wherein the null value signifies the lack of specific attribute information for a given token.

12. The computer system of claim 7, further comprising:
    querying an embedding database to find one or more records similar to the first record,
    wherein the second token in the second database record is selected from the one or more similar records.

13. A computer program product for processing records of a structured or semi-structured database, comprising:
    one or more tangible storage media storing programming instructions for execution by one or more processors to perform a method, the programming instructions comprising instructions for:
    generating semantic vectors for tokens associated with the records, wherein generating the semantic vectors comprises determining whether the tokens contain a null value, tagging the tokens containing the null value, and suppressing use of the semantic vectors associated with the tokens containing the null value when generating the semantic vectors for surrounding tokens containing a non-null value;
    imputing, to the null value of a first token associated with the tokens of a first database record, the non-null value of a second token associated with the tokens in a second database record, wherein the imputing comprises,
    determining whether the second database record is similar to the first database record based on comparing the semantic vectors of the tokens associated with the first database record to the semantic vectors of the tokens associated with the second database record, wherein comparing the semantic vectors comprises suppressing the semantic vectors associated with the tokens containing the null value; and in response to determining that the second database record is similar to the first database record, replacing the null value of the first token with the non-null value of the second token.

\* \* \* \* \*